US006239418B1

(12) United States Patent
Kōnig et al.

(10) Patent No.: US 6,239,418 B1
(45) Date of Patent: May 29, 2001

(54) MICROWAVE OVEN AND COMPONENTS THEREFOR

(75) Inventors: Udo Kōnig, Essen; Klaus Rōdiger, Bochum, both of (DE)

(73) Assignee: Widia GmbH, Essen (DE)

( * ) Notice: Subject to any disclaimer, the term of this patent is extended or adjusted under 35 U.S.C. 154(b) by 0 days.

(21) Appl. No.: 09/284,040

(22) PCT Filed: Oct. 2, 1997

(86) PCT No.: PCT/DE97/02293

§ 371 Date: Apr. 2, 1999

§ 102(e) Date: Apr. 2, 1999

(87) PCT Pub. No.: WO98/16965

PCT Pub. Date: Apr. 23, 1998

(30) Foreign Application Priority Data

Oct. 16, 1996 (DE) ..................................... 196 42 673

(51) Int. Cl.[7] ............................................. H05B 6/80

(52) U.S. Cl. ......................... 219/756; 219/690; 219/745; 219/762; 333/219

(58) Field of Search .................................. 219/756, 759, 219/690, 745, 746, 762; 333/219, 227, 248

(56) References Cited

U.S. PATENT DOCUMENTS

| | | | | |
|---|---|---|---|---|
| 4,006,073 | * | 2/1977 | Welch | 204/298 |
| 5,270,515 | * | 12/1993 | Long | 219/121.4 |
| 5,478,608 | * | 12/1995 | Gorokhovsky | 427/571 |
| 5,886,326 | * | 3/1999 | Tang | 219/679 |

* cited by examiner

*Primary Examiner*—Philip H. Leung
(74) *Attorney, Agent, or Firm*—Herbert Dubno; Andrew Wilford

(57) ABSTRACT

A microwave waveguide or resonator for conducting microwaves of high energy density at high temperature for sintering hard materials has a support of a highly heat-resistant material and a laminated body at least partially mounted on the support and having a surface coating consisting of nitrides, carbides, or carbonitrides of elements of the IVa to VIa groups of the periodic system and having a thickness between 0.10 $\mu$m and 100 $\mu$m.

12 Claims, 2 Drawing Sheets

10
11
14
12

MICROWAVE OVEN AND COMPONENTS THEREFOR

CROSS REFERENCE TO RELATED APPLICATIONS

This application is the U.S. national phase of PCT application PCT/DE97/02293 filed Oct. 2, 1997 with a claim to the priority of German application 196 42 673.1 filed Oct. 16, 1996.

FIELD OF THE INVENTION

The present invention relates to a component for a microwave oven, in particular a microwave waveguide and/or a microwave resonator (cavity) for conducting microwaves of high energy density at high temperature for sintering hard materials, which comprises a support of a highly heat-resistant material and a laminated body at least partially mounted on the support and having a surface coating.

The invention further relates to a resonator housing and to at least one flanged waveguide on it for microwave ovens equipped for microwave irradiation.

BACKGROUND OF THE INVENTION

U.S. Pat. No. 4,578,658 describes a microwave resonator and a microwave waveguide for conducting microwaves with high energy density. The components consist of a support body with a multi-layer coating of a thickness of about 5 $\mu$m of copper and silver.

In the sintering of metallic/ceramic composite materials such as hard metals or cermet in a microwave oven it is necessary to heat the material to be sintered to temperatures of 1800° C. which requires thermal insulation to avoid heat losses. There are basically two ways to do this, namely to insulate the charge being sintered with a microwave-transparent insulating material inside the resonator or to externally insulate the resonator housing.

The insulating material used inside the resonator housing that mainly consists of extremely pure aluminum-oxide foamed mats is not only very expensive but has the disadvantage that for example when sintering hard metals vapors sublime in the insulation and reduce the microwave transparency of the foam mats. The result is a “burning through” of the insulation as a result of it absorbing microwaves.

Applying external thermal insulation to the resonator housing, that does not need to be transparent to microwaves, has the disadvantage that all the parts inside the resonator housing, that is the resonator walls themselves, the coupling waveguide, any sensors or the like, must be made of a heat- and gas-resistant material to which end according to the state of the art temperature resistant metals are employed as materials for the microwave parts that can be exposed both to the microwave radiation as well as to the operating temperatures. Metals that are very resistant to high temperatures, such as for example molybdenum or tungsten, are not suitable as materials for microwave components since such metals carburize readily in the carbon in the sintering atmosphere. Graphite as well as other generally known materials resistant to high temperatures and elements of the sintering atmosphere are however much worse electrical conductors than metals so that they produce considerable losses in microwave energy. A graphite resonator housing thus is of low resonator efficiency.

OBJECT OF THE INVENTION

It is therefore an object of the present invention to provide a microwave-oven component as well as a microwave oven that can be used to sinter hard materials while avoiding the above-mentioned disadvantages.

SUMMARY OF THE INVENTION

These objects are attained in a microwave waveguide or resonator for conducting microwaves of high energy density at high temperature for sintering hard materials. The waveguide or the resonator has according to the invention a support of a highly heat-resistant material and a laminated body at least partially mounted on the support and having a surface coating consisting of nitrides, carbides, or carbonitrides of elements of the IVa to VIa groups of the periodic system and having a thickness between 0.

The material of the surface coating can be nitrides, carbides, or carbonitrides of elements of the IVa to VIa groups of the periodic system. This produces a composite body formed of a support and a surface coating at least partially mounted on the support, the support being a material resistant to high temperatures and the surface coating being of a material having a thickness between 0.1 $\mu$m and 100 $\mu$m and formed of a material resistant to the sintering atmosphere, more electrically conductive than the support, and in particular stable at high temperatures in a carburizing atmosphere. The surface coating is only applied according to the invention there where microwaves need to be conducted and where chemical reactions with the oven atmosphere need to be avoided. This relates in particular to the resonator-housing inner surface as well as to the waveguide parts arranged on the resonator housing inside the thermal insulation.

The support consists of graphite or a metal, a metal alloy, oxide ceramics, composite ceramics, SiC, $Si_3N_4$, or AlN. Metals, metal alloys (so long as they are temperature resistant) can also be used when they are protected on all sides by a tight surface coating from the carburizing gases. Preferably the material of the surface coating layer can be a carbide, carbonitride, or nitride of titanium. The surface coating can have plural layer with the individual layers made of the same or different materials. Preferred coating thicknesses are from 1 $\mu$m to 20 $\mu$m.

According to a further embodiment of the invention the surface coating or layers are applied by a CVD method at 900° C. to 1100° C.

The object is further attained by a microwave oven whose resonator-housing inner wall and/or waveguide surface inside the thermal insulation or in contact with the sintering atmosphere, in particular the waveguide inside surface or the waveguide outer surface is coated with a solid microwave-transparent body with a thickness of at most 100 $\mu$m of carbide, nitride, and/or carbonitrides of the IVa to VIa elements. Preferably the resonator housing and/or the waveguide each have a graphite substrate core whereby according to a further embodiment of the invention only the parts inside the thermal insulation of the graphite waveguide are coated.

According to a further feature of the microwave oven according to the invention there is between the insulation surrounding the resonator housing and the resonator housing an electrical heater (hybrid heater), preferably in the form of a resistive electrical heater.

BRIEF DESCRIPTION OF THE DRAWING

Embodiments of the invention are shown in the drawing. Therein.

SPECIFIC DESCRIPTION

Figure 1:
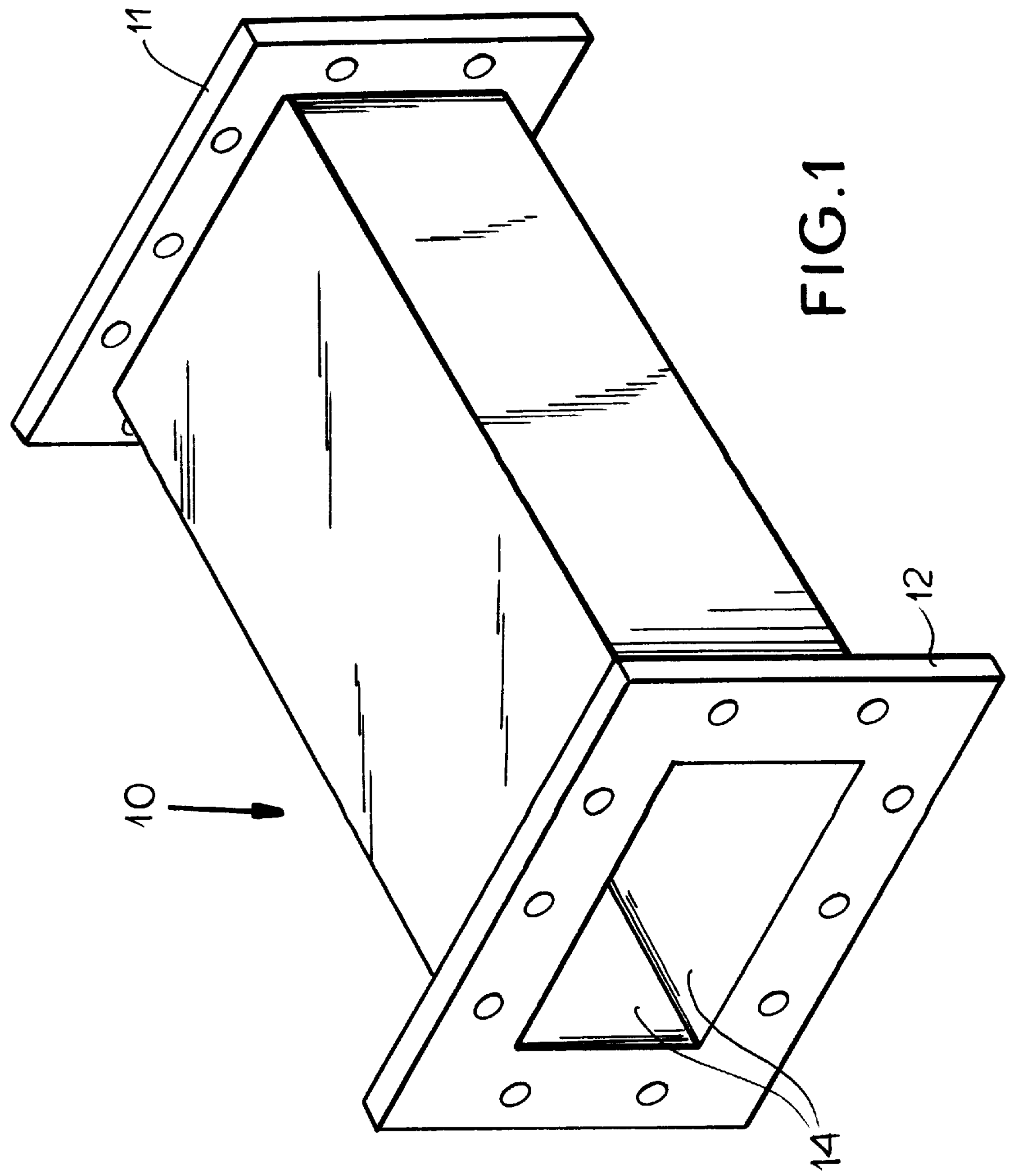
FIG. 1 is a perspective view of a part of a microwave waveguide.

The microwave waveguide conductor 10 shown in FIG. 1 as an example of a microwave component is formed as a box and has end flanges 11 and 12 for mounting further waveguide pieces and/or the oven. The flanges 11 and 12 have to this end corresponding bores 13. According to the invention the inner walls 14 of the waveguide are provided with a 10 $\mu$m thick layer of TiC or TiN. The microwave waveguide 10 otherwise is formed of graphite. Similarly it is for example possible to provide in the microwave-oven chamber solid bodies, e.g. of microwave-transparent materials like $Al_2O_3$ with an outer TiC coating of the stated thickness. In this case the coating serves as a wall of the microwaves running in the solid body.

Figure 3:
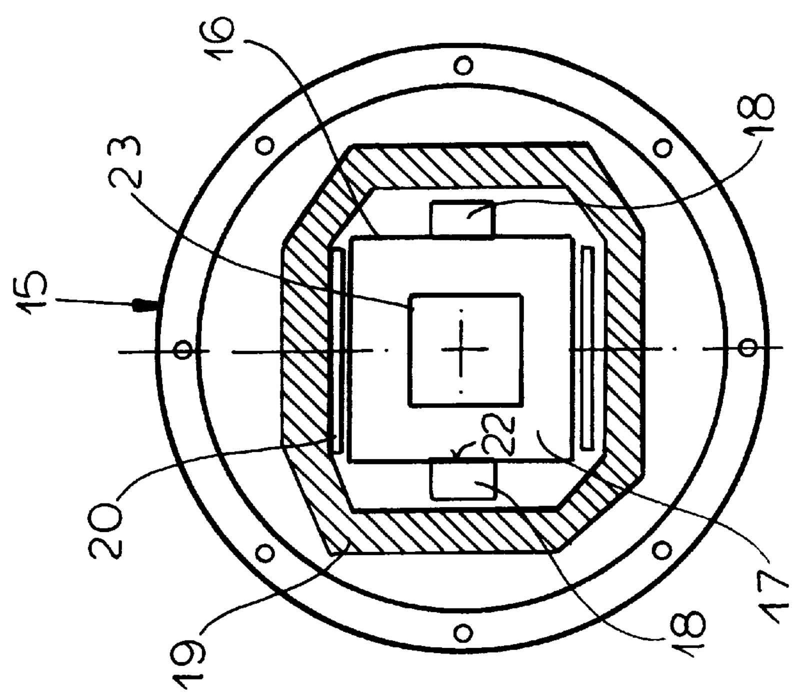
FIGS. 2 and 3 are various sections through a microwave oven.
Figure 2:
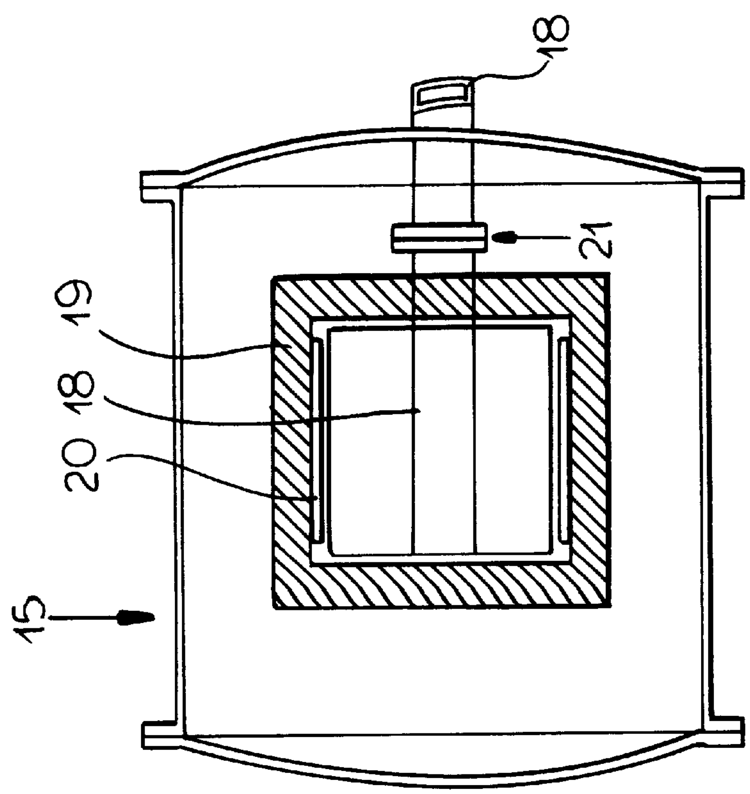

The microwave oven shown in FIGS. 2 and 3 is formed of an empty jacket 15 in which there is a resonator housing 16 into whose interior 17 via appropriate flanged waveguides 18 are fed microwaves for establishing the sinter temperature of the desired energy density in the space 17. The waveguides 18 can be made of a composite material, i.e. a metal, ceramic, or graphite support and an (inner) TiC coating. Correspondingly the resonator housing 16 is made of graphite with surfaces exposed in the space 17 carrying a TiN coating. Around the resonator housing is insulation 19 which can be of prior-art insulation material that only needs to be temperature resistant. Between the insulation 19 and the resonator housing 16 in order to avoid excessive temperature differentials between the sinter charge is an auxiliary heater in the form of electrical heat conductors 20. The microwave feed takes place via graphite waveguides that are connected outside the thermal insulation by flange mounts 21 with conventional waveguides of brass, copper, or stainless steel (FIG. 1). To accommodate the waveguide the jacket and the insulation have corresponding ports and the resonator housing 16 appropriate inlet openings 22.

In order to sinter selected hard-metal or cermet bodies that are set as a charge 23 in the resonator-housing space 17 on a frame or the like, an appropriate microwave energy field is formed so that as a result of microwave absorption the parts belonging to the charge are heated to the sintering temperature. At the same time the hybrid heater assists in that a temperature gradient from outside to inside is countered. Electrical current is fed to the heat conductors such that the temperature of the resonator wall corresponds to the charge temperature. The above-described TiN layer has the advantage that the conductivity of the corresponding inner surfaces relative to the surfaces formed of graphite can be improved, in particular graphite surfaces have an electrical resistance of 12 $\mu\Omega$m, while the resistance of the TiN surface can be dropped to 0.22 $\mu\Omega$m. As a result there are further minor electrical losses. In addition the selected TiC inner coating has the advantage of making the sinter atmosphere in the space 17 inert (even at high temperatures). The selection of the (support) materials of the microwave components is thus substantially increased and can take into account mechanical or manufacturing problems. Further the present invention has the advantage that somewhat used surfaces can be recoated without great expense.

What is claimed is:

1. A microwave resonator for conducting microwaves of high energy density at high temperature for sintering hard materials, the resonator comprising:

a support of a highly heat-resistant material; and a laminated body at least partially mounted on the support and having a surface coating consisting of nitrides, carbides, or carbonitrides of elements of the IVa to VIa groups of the periodic system and having a thickness between 0.1 $\mu$m and 100 $\mu$m.

2. The microwave resonator according to claim 1 wherein the support consists of graphite or a metal, a metal alloy, oxide ceramics, composite ceramics, SiC, $Si_3N_4$, or AlN.

3. The microwave resonator according to claim 2 wherein the surface coating consists of TiC, TiCN, or TiN.

4. The microwave resonator according to claim 1 wherein the surface coating has plural layers and the individual layers are made of different materials.

5. The microwave resonator according to claim 1 wherein the coating has a thickness from 1 $\mu$m to 20 $\mu$m.

6. The microwave resonator according to claim 1 wherein the surface coating is applied by a CVD method at 900° C. to 1100° C.

7. A microwave waveguide for conducting microwaves of high energy density at high temperature for sintering hard materials, the resonator comprising:

a support of a highly heat-resistant material; and a laminated body at least partially mounted on the support and having a surface coating consisting of nitrides, carbides, or carbonitrides of elements of the IVa to VIa groups of the periodic system and having a thickness between 0.10 $\mu$m and 100 $\mu$m.

8. The microwave waveguide according to claim 7 wherein the support consists of graphite or a metal, a metal alloy, oxide ceramics, composite ceramics, SiC, $Si_3N_4$, or AlN.

9. The microwave waveguide according to claim 7 wherein the surface coating consists of TiC, TiCN, or TiN.

10. The microwave waveguide according to claim 7 wherein the surface coating has plural layers and the individual layers are made of different materials.

11. The microwave waveguide according to claim 7 wherein the coating has a thickness from 10 $\mu$m to 20 $\mu$m.

12. The microwave waveguide according to claim 7 wherein the surface coating is applied by a CVD method at 900° C. to 1100° C.

* * * * *